(12) United States Patent
Bouyaud et al.

(10) Patent No.: US 8,081,939 B2
(45) Date of Patent: Dec. 20, 2011

(54) CORRELATION-DRIVEN ADAPTATION OF FREQUENCY CONTROL FOR A RF RECEIVER DEVICE

(75) Inventors: Mickael Bouyaud, LeMans (FR); Pierluigi D'Alessandro, Davenport, FL (US)

(73) Assignee: ST-Ericsson SA, Geneva (CH)

( * ) Notice: Subject to any disclaimer, the term of this patent is extended or adjusted under 35 U.S.C. 154(b) by 0 days.

(21) Appl. No.: 12/681,071

(22) PCT Filed: Sep. 30, 2008

(86) PCT No.: PCT/IB2008/053974
§ 371 (c)(1),
(2), (4) Date: Aug. 20, 2010

(87) PCT Pub. No.: WO2009/044337
PCT Pub. Date: Apr. 9, 2009

(65) Prior Publication Data
US 2010/0311372 A1 Dec. 9, 2010

(30) Foreign Application Priority Data
Oct. 1, 2007 (EP) .................................. 07291186

(51) Int. Cl.
*H04B 1/18* (2006.01)
(52) U.S. Cl. ................... 455/192.2; 455/234.1; 455/334; 375/345
(58) Field of Classification Search ............... 455/150.1, 455/151.1, 151.2, 192.1, 192.2, 243.1, 323, 455/334; 375/344, 345
See application file for complete search history.

(56) References Cited

U.S. PATENT DOCUMENTS

| | | | | |
|---|---|---|---|---|
| 6,324,228 B1 * | 11/2001 | Millward et al. | ............. | 375/344 |
| 6,493,406 B1 * | 12/2002 | Schweickert et al. | ........ | 375/344 |
| 6,801,590 B2 * | 10/2004 | Schweickert et al. | ........ | 375/344 |
| 7,453,962 B2 * | 11/2008 | Lee et al. | ...................... | 375/344 |
| 7,639,766 B2 * | 12/2009 | Wei | ................. | 375/355 |
| 2003/0057468 A1 | 3/2003 | Mori et al. | | |
| 2004/0058658 A1 | 3/2004 | Kirsch et al. | | |
| 2004/0071116 A1 | 4/2004 | You et al. | | |

OTHER PUBLICATIONS

PCT International Search Report, PCT/IB2008/053974, mailing date Mar. 2, 2009, 2 pages, European Patent Office, Rijswijk, NL.
3GPP TS 25.101, "3rd Generation Partnership Project; Technical Specification Group Radio Access Network; User Equipment (UE) Radio Transmission and Reception (FDD)", release 7, Mar. 2007; http://www.3gpp.org.; pp. 1-143.

\* cited by examiner

*Primary Examiner* — Nhan Le
(74) *Attorney, Agent, or Firm* — William J. Kubida; Peter J. Meza; Hogan Lovells US LLP

(57) ABSTRACT

A frequency-control unit is used for controlling an external controllable reference-frequency source. The frequency-control unit includes a filter unit with a controllable filter parameter, which is configured to derive, using the filter parameter, from a frequency-error signal a frequency-control signal for minimizing the frequency error of the reference frequency; and a correlation unit, which is configured to determine from frequency errors of the reference frequency at different points in time a correlation measure indicative of a correlation between the frequency errors at the different points in time. The frequency-control unit is configured to adapt the controllable filter parameter of the filter unit in dependence on the determined correlation measure. The value of the filter parameter can depend also on a receiver path strength, such as an RSCP value.

22 Claims, 8 Drawing Sheets

CORRELATION-DRIVEN ADAPTATION OF FREQUENCY CONTROL FOR A RF RECEIVER DEVICE

CROSS-REFERENCE TO RELATED APPLICATIONS

The present application is a national filing in the U.S. Patent & Trademark Office of PCT/IB2008/053974 filed Sep. 30, 2008, and claims priority of European Patent Application No. 07291186.0 filed Oct. 1, 2007, both of which applications are incorporated herein in their entireties by this reference.

FIELD OF THE INVENTION

The present invention relates to a frequency-control unit for use in controlling a reference frequency of an external controllable reference-frequency source, to a radio frequency (RF) receiver device comprising such a frequency-control unit, and to a communication device comprising a RF receiver device. It further relates to a method for controlling a frequency of a reference signal in a RF receiver device.

BACKGROUND OF THE INVENTION

In mobile telecommunication, electromagnetic waves in the radio frequency (RF) spectrum are used for communication between fixed network transceiver stations and user equipment (UE). An example of a mobile communication technology is the Universal Mobile Telecommunications System (UMTS). According to UMTS standards, user equipment and the base station transmit in respective radio frequency bands specified, e.g., by the $3^{rd}$ Group Partnership Project (3GPP) in the Technical Specification TS 25.101, which is incorporated herein by reference.

User equipment and the fixed network transceiver stations, which are referred to as Node B in UMTS standards, do not use the same frequency reference. A respective internal reference-frequency unit is used on each side as a frequency reference. In other words, the reference-frequency units generate respective local reference signals with a reference frequency. The reference signal on the transmitter side is used in generating a RF carrier signal in the process of modulating symbols to be transmitted. The reference signal on the receiver side is used in demodulating (down-converting) received signals for recovering symbols.

The frequency reference in the receiver part of a user equipment must be capable of tuning to the frequency of received RF signals in order to perform a demodulation with an error rate as low as possible. Therefore, the frequency reference on the receiver side is a controllable reference-frequency unit. It can for instance be implemented in the form of a controllable oscillator such as a voltage-controllable oscillator (VCO).

An error in the reference frequency of the reference signal generated by the controllable reference-frequency unit will result in an increased error rate of reception. Therefore, frequency-offset estimation algorithms have been developed for use in controlling the reference frequency of the reference signal in order to reduce a frequency mismatch between the received RF signals and the reference signal. The higher the accuracy of frequency-offset estimation, the lower can be the requirements on the complexity of the controllable reference-frequency unit.

In UMTS, TS 25.101 requires that the modulated carrier frequency, i.e., the reference frequency used by the user equipment, shall be accurate to within ±0.1 PPM (Part Per Million) observed over a period of one timeslot, in comparison to the carrier frequency received from a Node B. To accommodate this requirement, the user equipment performs an automatic frequency control (AFC) loop, which is sometimes also referred to as automatic frequency correction loop. AFC serves to keep the reference frequency of the UE within the required error margin with respect to the frequency of the RF signals received from the assigned Node B.

According to TS 25.101, causes of a frequency error between received RF signals and the internally generated reference frequency of a user equipment are a frequency error on the side of the Node B and a Doppler shift. TS 25.101 requires that in the latter case, signals from a Node B must be averaged over a sufficient time so that errors due to noise or interference are allowed for only within the ±0.1 PPM figure.

US 2003/0054768 A1 describes a RF receiver device for acquiring and tracking pilots in a CDMA (Code Division Multiple Access) communication system such as Wideband CDMA (W-CDMA), which is used in UMTS technology. Frequency acquisition is performed by means of a Rake receiver for a number of signal instances in a multipath reception configuration. Frequency tracking of the different multipath signals is performed using a combination of a frequency control loop, which is maintained for a precision oscillator used for down-converting the received signal, and by using further frequency control loops for the different Rake-finger processors assigned to the acquired multipath signals. Each finger processor has an associated frequency-control loop for frequency control of a rotator used for complex multiplication of received complex data samples on the respective path.

The dual-loop frequency control scheme disclosed in this document is rather complex. It would be desirable to provide a RF receiver device with a simpler frequency-control mechanism.

SUMMARY OF THE INVENTION

According to a first aspect of the invention, a frequency-control unit for use in controlling a reference frequency of an external controllable reference-frequency source is provided. The frequency-control unit comprises:

a filter unit with a controllable filter parameter, which filter unit is configured to derive, using the controllable filter parameter, from a frequency-error signal, which is receivable via an input port and indicative of a frequency error of the reference frequency with respect to a signal frequency of an external RF signal, a frequency-control signal for minimizing the frequency error of the reference frequency, and to provide the frequency-control signal at its output for use by the external controllable reference-frequency source;

a correlation unit, which is configured to determine from frequency errors of the reference frequency at different points in time a correlation measure indicative of a correlation between the frequency errors at the different points in time;

wherein the frequency-control unit is configured to adapt at least one of the one or more filter parameters of the filter unit in dependence on the determined correlation measure.

The frequency control unit of the invention is thus configured to determine a correlation measure between frequency errors related to RF signals received at different points in time. Furthermore, the frequency-control unit is configured to set the at least one controllable filter parameter in dependence on the determined correlation measure and thus adaptively derive the frequency-control signal. In operation, the frequency-control unit therefore can provide the frequency-control signal in an adaptive manner using a filter parameter, which depends on the correlation of frequency errors at different points in time.

A correlation measure of frequency errors is to be understood as a quantity that indicates a degree, to which two frequency errors determined at different points in time depart from independence. An illustrative example of a correlation measure is the Pearson product-moment correlation coefficient. On the basis of a correlation distinction using the determined correlation measure, frequency control is enhanced, for instance, in specific propagation environments, in which a RF receiver comprising the frequency-control unit device is currently located. As an example of a suitable filter parameter, the frequency bandwidth of the filter unit is made controllable in one embodiment to provide for its adaptability in dependence on the correlation measure.

Advantages of the RF receiver device are explained in the following by way of an illustrative example, without implying any restriction of the frequency-control unit of the first aspect of the invention to this exemplary application case. Consider the frequency errors of the reference signal of a mobile user equipment (UE) for RF (radio frequency) communication in different signal-propagation environments. Consider as a first environment in this exemplary consideration a line-of-sight (LOS) environment, in which the received RF signal from a fixed transmitter station typically reaches the UE via only one propagation path. A frequency error detected in a mobile UE under this condition is dominated by a Doppler shift, and therefore due to the (variable) velocity of the UE relative to the fixed transmitter. The mean value of the frequency error therefore corresponds to the Doppler shift. The variance of the frequency error under this condition is low. Then consider for comparison a second exemplary environment, in which the RF signal received by the mobile UE has been subjected to multiple reflection and refraction on its propagation path before reception. Such an environment is typically an urban environment. Under such propagation conditions, which are referred to as non-line-of-sight (NLOS) conditions, the mean frequency error typically vanishes. The variance of the frequency error is dependent on the current velocity of the user equipment. Such a situation can be characterized by Rayleigh fading models. The frequency-control unit will thus find a higher value of the correlation measure of the frequency error in the first (LOS) environment and a lower value of the correlation measure between the frequency errors in the second environment.

In a LOS environment, the Doppler shift of the frequency may change quickly as a function of the variable speed of the user equipment. Therefore, a large bandwidth of the filter unit can be set by the frequency-control unit, in order to provide short response times in correcting for frequency errors. On the other hand, under NLOS conditions, a smaller frequency bandwidth of the filter unit is set in order to reduce the variance of the frequency error.

On the other hand, if no use were made of the invention, i.e., in the presence of fixed filter parameters, the frequency-control unit would not be able to adapt to the different requirements of LOS and NLOS conditions in a communication between the transmitter of the access network and the UE. Referring again to the example of the filter bandwidth of the filter unit, a fixed wide-band filter unit would result in too much uncertainty and variance of the frequency-error correction in a NLOS communication. A fixed narrow-band filter unit on the other hand would result in a frequency control with a reduced frequency tracking speed in a LOS communication, i.e., the RF receiver device would have difficulties to follow a frequency change.

It thus becomes clear from the above illustrative example that the frequency-control unit of the present invention is capable of adapting the filter properties of the filter unit to the sometimes conflicting requirements of different signal propagation conditions of a communication. In other words, the frequency-control unit is able to optimally adapt to requirements of noise reduction on one hand and convergence speed of the reference frequency on the other hand. This adaptivity is, of course, not restricted to the mentioned application case of LOS and NLOS communications, and not restricted either to the adaptivity of the frequency bandwidth as the filter parameter of the filter unit of the frequency-control unit. Any distinction between filtering requirements that are associated with distinguishable values of the correlation measure of the frequency error forms an application case, in which the frequency-control unit of the present invention shows to advantage. Furthermore, any suitable filter parameter of the filter unit can be made adjustable to provide adaptive filtering in the frequency-control unit in accordance with the present invention.

Note that the mentioned goal of a minimization the frequency error is to be understood as a reduction of the frequency error to a value falling within a predetermined acceptable frequency-error interval. The mentioned ±0.1 PPM figure defined in TS 25.101 is an example of such an acceptable frequency-error interval. In the application case of mobile telecommunications, especially for telecommunications according to UMTS standards, the frequency-control unit of the first aspect of the invention is also referred to as an automatic-frequency-control (AFC) unit.

In the following, embodiments of the frequency-control unit of the first aspect of the invention will be described. The embodiments can be combined with each other to form further embodiments, unless embodiments are explicitly described as forming alternatives to each other.

In one embodiment of the RF receiver device, the frequency-control unit is configured to set as a filter parameter a frequency bandwidth of the filter unit in dependence on determined correlation measure. The advantage of this embodiment has been described in the above context of the adaptivity to LOS and NLOS communications. In particular, the adaptivity is in one form of this embodiment implemented in that the frequency-control unit is configured to set a larger frequency bandwidth of the filter unit in the presence of a correlation measure falling into a predetermined first correlation interval that is indicative of a high correlation of the frequency errors, and to set a lower frequency bandwidth of the filter in the presence of a correlation measure falling into a predetermined second correlation interval that is indicative of a low correlation of the frequency errors. The first and second correlation intervals form number intervals. Typically, but not necessarily, the first and second correlation intervals partition the interval between 0 and 1 into two sub-intervals, which are associated with a low and high correlation of the frequency errors, respectively.

Preferably, the frequency control unit comprises a statistics unit connected with the filter unit and configured to determine at least one statistical parameter of the frequency error over a predetermined number of points in time, the at least one statistical parameter being different from said correlation measure. The frequency-control unit is in this embodiment further configured to derive the frequency-control signal in additional dependence on the statistical parameter of the frequency error. Suitably, the statistics unit is configured to use a predetermined time window to determine statistics of the frequency error over a predetermined number of points in time. Suitably, the filter unit is configured to determine as the at least one statistical parameter a mean value of the frequency error or a variance of the frequency error, or both, the mean value and the variance, from a set of frequency error values determined during the predetermined time window. The derivation of the frequency-control signal in additional dependence on the statistics of the frequency errors reduces the noise of the reference frequency signal to be generated by the external controllable reference-frequency source.

In a further embodiment, the frequency-control unit is configured to derive the frequency-control signal in a situation of continuous reception of RF signals such that at a point in time n the frequency-control signal is derived in dependence on the frequency-control signal at a foregoing point in time n−1 in correspondence to the formula $$FOC[n]=FOC[n-1]+k[n]\cdot FOE[n-1], \quad (eq. 1)$$

wherein FOC[n] denotes a frequency-control-signal value at the point in time n, FOC[n−1] denotes a frequency-control-signal value at the point in time n−1, FOE[n−1] denotes the frequency error at the point in time n−1, and k[n] denotes a filter coefficient at the point in time n.

In this embodiment the frequency-control unit uses a simple first-order adaptive filter algorithm, which avoids complexity in the filter design.

An advantageous example of a suitable adaptation with an adaptable filter coefficient increases the variation of k upon detecting a larger correlation between the frequency errors related to RF signals received at next neighboring points in time.

In particular, the filter unit may be configured to determine the filter coefficient k[n] according to the formula $$k[n]=k[n-1]+\delta\cdot f_{n-1}(FOE) \quad (eq. 2)$$

wherein k[n−1] denotes a filter coefficient at the point in time n−1, δ denotes a predetermined fixed step size for the adaptation of k and thus corresponds to a nominal rate of change of k, and f(FOE) is the correlation measure of frequency-errors related to RF signals received at different points in time. In the implementation of eq. 2, the nominal rate of change of k is thus weighted by the correlation measure f(FOE) computed up to the previous cycle n−1 to determine the actual rate of change. The filter coefficient k thus forms a filter parameter, which is set in dependence on the determined correlation measure for adaptively deriving the frequency-control signal. The value of k affects the convergence speed of the frequency-control unit in the process of minimizing the frequency error.

Preferably, a predetermined period of the frequency-control loop between consecutive refreshments of k is set in consideration of the fact that the radio propagation environment (transition from LOS to NLOS) varies slowly in comparison with the periodicity of the frequency-control loop; this aspect is also controlled by an appropriate choice of the parameter δ. As a consequence, AFC filter parameters are not influenced by short-term fading effects, but depend only on medium/long term propagation conditions.

In one embodiment correlation measure $f_{n+1}(FOE)$ at a point in time n+1 is determined according to the formula $$f_{n+1}(FOE) = \frac{E(FOE[n]\cdot FOE[n+1])}{E(FOE^2[n])} \quad (eq. 3)$$

wherein E( . . . ) denotes an operation of forming a mean value of a term included in the brackets. The mean value is preferably determined over a predetermined moving time window, i.e., forms a moving average.

As an illustrative example, in the case in which symbol/slot rate operations are hardware-implemented it is convenient to perform accumulation on a frame length before processing, and an integration length of one frame followed by a tuning of δ is an example of an appropriate choice. The integration length for computing the correlation of the frequency error, is in one embodiment be chosen in consideration of the rate of change of k. In this embodiment, the correlation length and δ are matched to each other, and both are chosen with additional view to the underlying hardware and/or software architecture. Note that in general a high correlation length could harm the responsiveness of the algorithm to changing scenarios, which require a fast change in k; on the other hand, δ can be tuned to cope with the range of typical situations encountered on the field.

In an alternative embodiment, to reduce the complexity, a "fixed-step" or "sign" implementation of the filter unit can be applied, in which the next k is computed as follows:

$$k_n=k_{n-1}+\delta\cdot sign(f_n(FOE)) \quad (eq. 4)$$

Here, sign ( . . . ) denotes the sign function, which returns the sign of a term in the brackets.

However, the mentioned alternatives can be implemented to be available as alternative options for selection in one embodiment to increase the variability of adaptation of the controllable filter parameter(s). In view of these mentioned and, generally, other available adaptation algorithms, the frequency-control unit is thus in one embodiment configured to switch between different adaptation algorithms for setting the at least one controllable filter parameter. Such switching is suitably also internally controlled and performed in dependence on the determined correlation measure, and/or on other parameters such as duty cycle of reception or the received signal power.

For instance, the filter unit is in one embodiment configured to set, in a situation of discontinuous reception, the at least one controllable filter parameter to a predetermined constant value. This embodiment provides for an appropriate filtering in communication situations, in which the duty cycle of the reception of a serving cell is relatively small, like in an IDLE mode of UMTS.

Generally, in preferred embodiments, the frequency-control unit is configured to adapt the controllable filter parameter of the filter unit not only in dependence on the determined correlation measure. In an important embodiment, the frequency-control unit is configured to adapt the controllable filter parameter of the filter unit in additional dependence on a received signal power. In other words, the received signal power is used as a further parameter determining the filter setting, i.e., the controllable filter parameter(s). Accordingly, in such embodiments, the frequency control unit has an input for received-signal-power values indicative of a signal power of demodulated output signals derived from the external RF signal.

The frequency control unit is in one form of such embodiments suitably configured to set the at least one filter coefficient to a predetermined lower first constant value in the presence of a received-signal power value not exceeding a receive-signal-power threshold value, and to a predetermined higher second constant value in the presence of a received-signal power value exceeding the receive-signal-power threshold value. This embodiment is particular suitable for an IDLE-mode situation. In such a situation, the gaps during which a common pilot signal is not received, can form a relevant percentage of the total reception time. Under these conditions, especially in presence of a LOS condition, the frequency error to be corrected in each measurement occasion can be relevant. The present embodiment implements a strategy, which is based on a selection between the rare measurement occasions. "Good" measurements are distinguished from "bad" measurements on the basis of the received-signal power value. Only the "good" measurements are used to apply strong corrections, i.e. higher values of the filter coefficient k. In one implementation, the filter coefficient is set to a value of 0.95 for received-signal power values exceeding the threshold value, and to 0.25 for received-signal power values below the threshold value.

In one embodiment, this setting of the filter coefficient is preferably the only adaptation used in an IDLE mode situation, with other adaptation methods being used in other modes of reception in that embodiment. In a particular embodiment of this type, the adaptation according to eq. 3 is not used in an IDLE mode.

Note that the selection of good measurements for the purpose of setting the filter coefficient can also form an applicable option in a normal mode with continuous signal flow, in order to improve the convergence speed of the frequency control loop. In such an embodiment, phases of RF-signal reception, in which the received RF signal is stronger, may be selected to apply a stronger correction in comparison with phases, in which the received RF signal is weaker. However, other methods of discriminating the setting of controllable filter parameters in additional dependence on the received-signal-power values than the ones mentioned in the previous paragraphs can be implemented by means the frequency-control unit.

The frequency-control unit of the invention is particularly useful in an embodiment that is configured for use in a RF receiver device that has a demodulator unit of the Rake-receiver type. A demodulator unit of the Rake-receiver type is as such known in the art. A RF receiver device for use with this embodiment has the demodulator unit of the Rake-receiver type connected between a receiver unit and a frequency-offset estimator. The use of a demodulator unit of the Rake-receiver type is particularly advantageous in situations of signal distortion due to multi-path propagation effects, such as in NLOS propagation conditions. A demodulator unit of the Rake-receiver type is typically configured to demodulate, via a plurality of Rake fingers, down-converted signals, which, in a RF receiver device are fed to the demodulator unit from a receiver unit comprising or connected with an antenna. The demodulator unit of the Rake-receiver type is further configured to provide output signals representing symbols, i.e., signal entities, which represent one or more bits in a predetermined number and sequence and which are coded by predefined signals, e.g., in the baseband. The role of a Rake finger or, in other words, a Rake-finger unit comprising a Rake-finger processor is to discriminate and process a signal component associated with one of the multiple propagation paths. The different Rake-finger processors can be integrated in one integrated-circuit section forming the demodulator unit.

In embodiments for use with a demodulator unit of the Rake-receiver type, the frequency-control unit has input ports being assigned to different Rake fingers of an external demodulator unit of the Rake receiver type. The frequency-control unit is configured to determine the correlation measure from a combination of the frequency-error signals provided by the Rake fingers, wherein RF signals corresponding to different propagation paths and processed in different Rake fingers are associated with a single point in time for the purpose of determining the correlation measure.

In this configuration, it is advantageous that the frequency-control unit is configured to determine the correlation measure as a linear combination of respective correlation measures between frequency errors associated with received respective RF signals at the Rake fingers. Preferably, the frequency control unit is configured to combine the correlation measures with respective weights associated with the Rake fingers, wherein the frequency-control unit is configured to assign a respective weight associated with a respective Rake finger in dependence on a received-signal-power value associated with the particular Rake finger. Thus, the value of the filter parameter (k) depends not only on the correlation in the frequency error but also on a receiver path strength, as specified for instance by received-signal power value. This embodiment therefore merges aspects of linear and non-linear filtering on a single branch. The dependence of the filter parameter (k) not only on a lag-1 correlation computed on frequency errors (FOE) but also on the received power per path can be considered as a correlation at lag-0 on channel estimates. As an illustrative example, UMTS defines a suitable quantity indicative of a received-signal power as the received signal code power RSCP.

In one embodiment, the frequency-control unit is configured to determine Rake-finger filter coefficients $k_j[n]$ (cf. eq. 2) for the Rake fingers individually, according to the formula $$k_j[n] = k_j[n-1] + \delta \cdot f_n(FOE_j) \quad \text{(eq. 5)}$$

wherein $k_j[n-1]$ denotes a Rake-finger coefficient at the point in time n−1 for a Rake finger indexed by j, δ denotes a step size for the adaptation of k and thus corresponds to a rate of change of $k_j$, and $f_n(FOE_j)$ is the correlation measure of frequency-errors of the Rake finger indexed by j related to RF signals received by this Rake finger at different points in time. The index j varies between 1 and the total number of Rake fingers. In this embodiment the frequency control unit, or, in particular, the filter unit is configured to determine a frequency offset correction per finger. The final correction to apply is obtained by either averaging the correction per finger, i.e.

$$FOC = \frac{1}{N} \sum_j FOC_j \quad \text{(eq. 6)}$$

or by applying a maximum ratio combining of the $FOC_j$ $$FOC = \sum_j a_j FOC_j \quad \text{(eq. 7)}$$

wherein j again denotes an index of between 1 and the total number of Rake fingers. $a_j$ denotes respective weight factors that can be used for normalization. Methods of determining the weight factors will be discussed further below.

In another embodiment, the frequency-control unit is configured to determine a mean value of the received-signal-power values of all Rake fingers, and to disregard all Rake fingers with received-signal-power values contributing to the mean value for the purpose of deriving a frequency-control signal, if the mean value does not exceed a predetermined threshold value.

In a further Rake-receiver type of embodiment the frequency-control unit is configured to determine the correlation measure as a combination of respective correlation measures between frequency errors associated with received RF signals at the Rake fingers. The determined correlation measure of this embodiment can be computed as a linear combination according to the formula $$f_{n+1}(FOE) = \sum_j a_j \frac{E(FOE[n,j] \cdot FOE[n+1,j])}{E(FOE^2[n,j])}, \quad (\text{eq. 8})$$

wherein j denotes an index of between 1 and the total number of Rake fingers. $a_j$ denotes respective weight factors that can be used for normalization. However, the use of weight factors in eq. 8 is an option and not a requirement.

In this example, the computation of the filter coefficient k[n] of eq. 2 is thus performed according to $$k[n] = k[n-1] + \delta \cdot \sum_j a_j \frac{E(FOE[n-1,j] \cdot FOE[n,j])}{E(FOE^2[n-1,j])} \quad (\text{eq. 9})$$

The weight factors $a_j$ can be determined according to one of the following examples. In one particular embodiment, the following boundary condition is used for the weight factors:

$$\sum_j a_j = 1 \quad (\text{eq. 10})$$

Given a number of m Rake fingers, $a_j$ can in a simple embodiment be set as $$a_j = 1/m \quad (\text{eq. 11})$$

The weight factors can in an alternative embodiment depend on a respective received-signal power value for the respective Rake finger. Using, as an illustrative example, again quantities defined by UMTS, a suitable received-signal power value at a point in time n is the Received Signal Code Power $RSCP_{j,n}$ from Rake finger j. One can therefore write $$a_j(n) = a_j(RSCP_{j,n}) \quad (\text{eq. 12})$$

The respective weight factor suitably increases with the respective RSCP in an either sublinear, linear or superlinear manner. In each of these embodiments implementing eq. 12, it is exploited that those Rake fingers, which received weak RF signals, have a lower weight in their influence on the correction of the reference frequency. On the other hand, Rake fingers having received strong RF signals will be the main drivers for the frequency correction. This further improves the convergence speed of the frequency-control towards the desired agreement between the received frequency and the reference frequency.

Eq. 12 can also be implemented by setting to zero those weight factors or simply discarding for the purpose of determining the frequency-control signal those signals associated with Rake fingers, which provide a received-signal power below a predetermined threshold, satisfying, e.g., a relation of the type $$RSCP_{j,n} < RSCP_{th} \cdot E(RSCP_n) \quad (\text{eq. 13})$$

wherein $RSCP_{j,n}$ denotes the Received Signal Code Power at a point in time n from Rake finger j, $RSCP_{th}$ denotes the predetermined RSCP threshold, and $E(RSCP_n)$ denotes a mean value of the RSCP values of all Rake fingers at the point in time n. In one embodiment, in a situation, where $$E(RSCP_n) < RSCP_{th} \quad (\text{eq. 14})$$

the frequency-control unit is configured to ignore the complete set of current RSCP values received from the Rake fingers. In other words, in this embodiment the filter unit is configured to determine a mean value of the received-signal-power values of all Rake fingers, and to disregard all Rake fingers with received-signal-power values contributing to the mean value for the purpose of deriving a frequency-control signal, if the mean value does not exceed a predetermined threshold value.

Suitably, in some embodiments the filter unit of the frequency-control unit comprises two subunits:
 a first filter stage configured to derive the frequency-error signal from a combination of the respective frequency-error signals associated with different Rake fingers; and
 a second filter stage, which is connected with the first filter stage and which is configured to derive the frequency-control signal.

A second aspect of the invention is formed by a RF receiver device, which comprises
 a controllable reference-frequency unit, which is configured to provide at its output a reference signal having a reference frequency, the reference frequency depending on a frequency-control signal;
 a receiver unit, which is connected with the controllable reference-frequency unit and connectable with an external antenna, and which is configured to down-convert, using the reference signal, RF signals received via the external antenna and to provide the down-converted RF signals as output signals;
 a frequency-offset estimator, which is connected with the receiver unit and configured to provide at its output a frequency-error signal indicative of a frequency error of the reference signal with respect to a frequency of the received RF signals; and
 a frequency control unit according to the first aspect of the invention or one of its embodiments.

The RF receiver device as a whole is preferably provided in the form of an integrated circuit on a single chip. This way, it reduces the space requirements of a RF receiver device in portable RF communication devices, such as mobile telephones, in particular those configured for operation under the UMTS standard, portable computers such as laptops, PDAs, smart phones or others. However, the functional units of the RF receiver device may alternatively be provided separately as different integrated circuits on different chips, such that the RF receiver device takes the form of a chip assembly, a chip set, or a system in package (SIP).

In one embodiment, the RF receiver device of the second aspect of the invention further comprises a demodulator unit, which is configured to demodulate the output signals of the receiver unit and to determine and provide at its output received-signal-power values indicative of a signal power of the demodulated output signals of the receiver unit.

In accordance with previously described embodiments of the frequency-control unit of the first aspect of the invention that are configured for use with a demodulator of the Rake receiver type, the demodulator unit of the RF receiver device of the second aspect of the invention is a demodulator unit of the Rake-receiver type, which, in a direction of signal flow, is connected between the receiver unit and the frequency-offset estimator and which is configured to demodulate the output signals of the receiver unit via a plurality of Rake fingers, different Rake fingers being assigned to output signals of the receiver unit corresponding to RF signals received by the receiver unit at different points in time due to propagation of the RF signal along different propagation paths, and to provide output signals from each Rake finger representing symbols derived from the external RF signals received via different propagation paths. In such embodiments, preferably, the frequency-offset estimator is configured to provide respective frequency-error signals individually for each Rake finger; and the frequency-control unit is configured to derive the frequency-control signal using the frequency-error signals from the different Rake fingers. RF signals corresponding to different propagation paths and processed in different Rake fingers are associated with a single point in time for the purpose of determining the correlation measure.

In another embodiment, of the RF receiver device of the second aspect of the invention, the demodulator unit is further configured to determine and provide at its output respective received-signal-power values indicative of a signal power received via a respective one of the Rake fingers.

A third aspect of the invention is formed by a communication device that comprises a RF receiver device according to the second aspect of the invention, preferably one, which is configured to receive and process RF signals according to a UMTS standard.

A fourth aspect of the invention is formed by a method for controlling a frequency of a reference signal in a RF receiver device. The method comprises:
  providing a reference signal having a reference frequency, the reference frequency depending on a frequency-control signal;
  receiving RF signals from an external antenna;
  determining a frequency-error signal indicative of a frequency error of the reference signal with respect to a frequency of the received RF signals; and
  deriving, using predetermined filter parameters, from the frequency-error signal a frequency-control signal for minimizing the frequency error and providing the frequency-control signal to an external controllable reference-frequency source;
  wherein deriving the frequency-control signal comprises determining a correlation measure between the frequency errors related to RF signals received at different points in time and setting at least one of the filter parameters in dependence on the determined correlation measure, thus adaptively deriving the frequency-control signal.

The advantages of the method of the fourth aspect of the invention correspond to those described for the frequency-control unit of the first aspect of the invention. Embodiments of the method correspond to those of the RF receiver device of the second aspect of the invention, which includes the different embodiments of the frequency-control unit of the first aspect of the invention. In particular, thus, embodiments of the present method comprise performing the respective additional functionalities of the above-described embodiments of the frequency-control unit of the first aspect of the invention.

A further aspect of the invention is formed by a computer program comprising program code for causing a computer to carry out the steps of the method of the fourth aspect of the invention when the computer program is carried out on a computer. The term computer is used with a meaning that, as one embodiment, comprises signal and data processing hardware present in a mobile user equipment device, such as a mobile telephone, a PDA, a smart phone, etc.

Preferred embodiments of the various mentioned aspects of the invention are also defined in the dependent claims.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1:
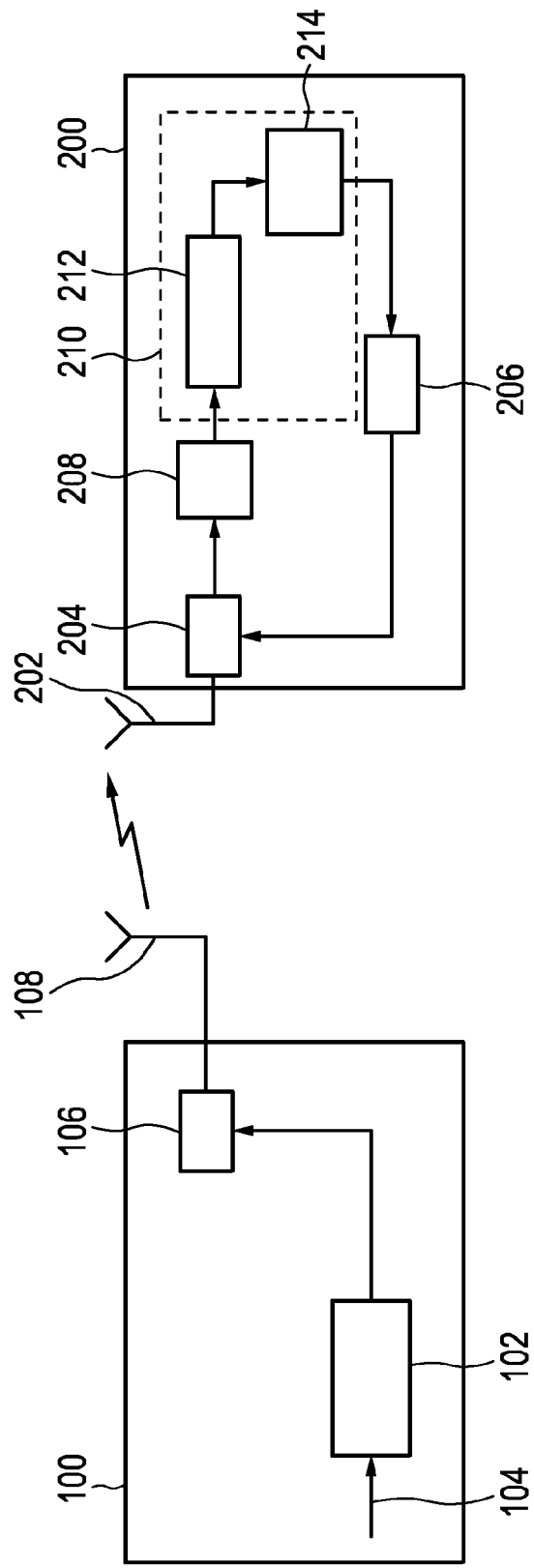
FIG. 1 shows a simplified diagram illustrating some functions of a base station and an embodiment of a communication device according to the invention in a downlink communication.

FIG. 1 shows a simplified diagram illustrating some functions of a base station and an embodiment of a communication device according to the invention in a downlink communication.

The representation of functional and structural detail in FIG. 1 is restricted to general functional aspects of a base station 100 and a RF receiver device 200, which are related to the generation and control of internal reference frequencies in the respective devices 100 and 200. The RF receiver device 200 is typically integrated into a RF communication device, which RF communication device also referred to as a user equipment (UE) in the art. A user equipment can for instance be a mobile telephone, a smart phone, a personal digital assistant, a laptop computer, or any other user equipment for RF communication. The RF receiver device 200 may be provided as a chip set comprising several chips mounted and connected on, e.g., a printed circuit board, or as a chip assembly of several chips integrated in a common chip housing, or as a System-in-Package, or as a single chip.

The communication situation shown in FIG. 1 is typical for cellular radio access networks enabling voice or data communication. An example, in which the embodiments of the invention described in the following are particularly applicable, is a communication according to a UMTS standard as specified for instance by the 3$^{rd}$ Group Partnership Project (3GPP). According to the UMTS standard, as specified for instance in Technical Specification (TS) 25.101, section 5, the physical layer of the RF receiver device 200 communicates to the physical layer of the network base station 100 by using electromagnetic waves in the Radio Frequency (RF) range.

For signal modulation, the RF receiver device 200 and the base station 100 transmit in a frequency band specified by TS 25.101. TS25.101 is incorporated herein by reference in its entirety.

However, it important to note that the RF receiver device 200 and the base station do not employ the same reference frequency in their mutual communication. This will be explained to some detail in the following.

The base station 100 relies on a reference frequency generated internally by an oscillator 102, which is internally controlled using a mechanism not shown here in detail, but indicated by arrow 104, which represents a signal line for providing control commands to the oscillator 102. The reference frequency generated by the oscillator 102 is then provided to a base-station RF part 106 that up-converts digital base band signals representing symbols to RF signals to be transmitted via an antenna 108. The RF signals thus have a carrier frequency corresponding to the internal reference frequency provided by oscillator 102.

The transmitted signal is received by the RF receiver device 200 via an internal or external receive antenna 202, and the received signals are down-converted by a UE RF part or, in other words, receiver unit 204. Note that the UE RF part 204 or receiver unit may additionally be configured for up-converting a digital base band signals to the carrier frequency in a process of uplink communication with the base station 100. However, uplink communication is not considered in the present context.

The UE RF part 204 or receiver unit is 204 configured for sampling the received downlink signal and for down-converting it to digital signals. In the frequency domain, this sampling represents as a shift from the carrier frequency back to the base band frequency. Typically, the base band frequency is approximately null.

The sampling performed by the UE RF part 204 is done in the communication device at a reference frequency, which is provided by a controllable reference-frequency source 206, typically a controllable oscillator like a voltage controllable oscillator (VCO).

Thus, as explained in the foregoing paragraphs, the RF receiver device 200 does not use the same reference-frequency source 206 as the base station 100, which uses the controllable oscillator 102 as its internal reference-frequency source. However, the carrier frequency used for modulation of data on the base-station side and for demodulation of the received RF signals on the side of the RF communication device 100, must be the same, as can for instance be derived from TS 25.101, section 5.3. Consequently, the reference-frequency source on the side of the RF receiver device 200 must be controlled for tuning it to the carrier frequency of the transmitted RF signals, to perform optimal demodulation in a demodulator 208. The error in frequency on the receiving end in a downlink communication with respect to the carrier frequency is typically the result of an residual error of an estimated transmitted frequency and of an error in the characteristics of the reference-frequency source 206.

For minimizing the frequency error, an AFC unit 210 is provided in the RF receiver device 200. In the present context, the abbreviation AFC means automatic frequency-control. The AFC unit is 210 is also referred to as an AFC loop. Both alternative terms will be used within the present specification when referring to the AFC unit 210, without implying a difference in meaning or functionality. The task of the AFC unit 210 is to provide control signals at its output for use in controlling the reference frequency of the controllable reference-frequency source 206.

Note further, that for the purpose of clearly distinguishing functionalities of different sub-units present in the RF communication device 100 and for defining the scope of the claims, the controllable reference-frequency source 206 is considered as an external unit with respect to the AFC unit 210. However, this distinction does not exclude that the reference-frequency source 206 and the AFC unit 210 are provided on a single chip in different portions of one and the same integrated circuit in some embodiments.

The demodulator 208 is configured to demodulate the output signals of the receiver RF part 204, which in the claims is referred to as a receiver unit. Symbols are provided at the output of the demodulator unit 208. The demodulator unit 208 is in one embodiment of the Rake-receiver type, as will be explained in more detail below with reference to FIGS. 2 to 4. Note, however, that in another embodiment a demodulator unit is used, which is not of the Rake-receiver type. The invention does not rely on the use of a particular type of demodulator unit.

The AFC unit 210 provided on the output side of the demodulator unit 208 has a frequency-offset estimator 212, which is configured to provide at its output a frequency-error signal indicative of a frequency error of the reference signal provided by the reference-frequency source 206 with respect to a frequency of the RF signals received via antenna 202 from base station 100. Frequency-offset estimation algorithms are well known in the art and will not be explained in more detail here. The frequency-error signal provided by the frequency-offset estimator forms an input for the frequency-control unit. Thus, for clarification with respect to the claim language, the frequency-offset estimator 212 is a unit that is external to the frequency-control unit 214. However, the frequency-offset estimator 212 and the frequency-control unit 214 may be provided on a single chip in an integrated circuit.

The frequency-control unit 214 uses the frequency-error signal received from the frequency-offset estimator 212 to generate and provide at its output a frequency-control signal. On the basis of the frequency-control signal generated and provided by the frequency-control unit 214, the controllable reference-frequency source 206 is controlled to generated the reference signal with a reference frequency that minimizes the frequency error with respect to the signal frequency of the external RF signal. Therefore, the function of the AFC unit 210 and, in particular the frequency-control unit 214, is to provide control signals that keep the reference frequency used within the RF receiver device 200 as close as possible to the frequency of the RF signals received from the base station 100. To give an example of the accuracy, with which the AFC unit 210 is required to work, TS 25.101, section 6.3 requires that "the modulated carrier frequency generated in the RF receiver device 200 shall be accurate to within ±0.1 PPM (Parts per Million) observed over a period of one timeslot compared to the carrier frequency received from the base station 100, which in the language of UMTS is a Node B. TS 25.101 continues that signals received from the Node B "will have an apparent error due to Node B frequency error and Doppler shift. In the later case, signals from the Node B must be averaged over sufficient time that errors due to noise or interference are allowed for within the ±0.1 PPM figure. The UE shall use the same frequency source for both RF frequency generation and the chip clock." Details of the structure and operation of the frequency-control unit 214 will be explained in the context of the following figures, in particular, FIGS. 4 to 9.

Figure 2:
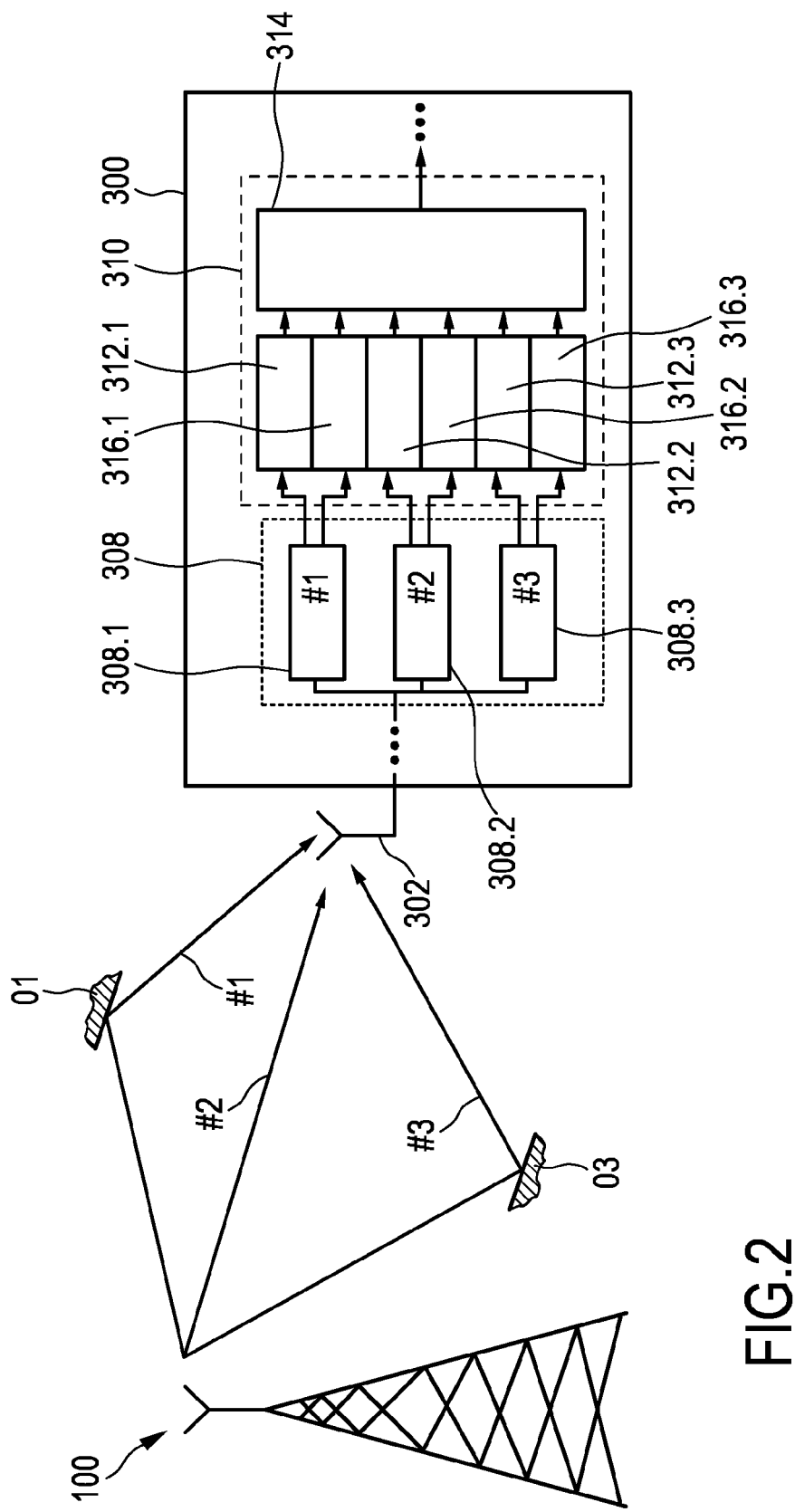
FIG. 2 shows a schematic diagram illustrating an embodiment of a RF receiver device with a demodulator unit of the Rake-receiver type in a downlink communication with a base station.
Figure 3:
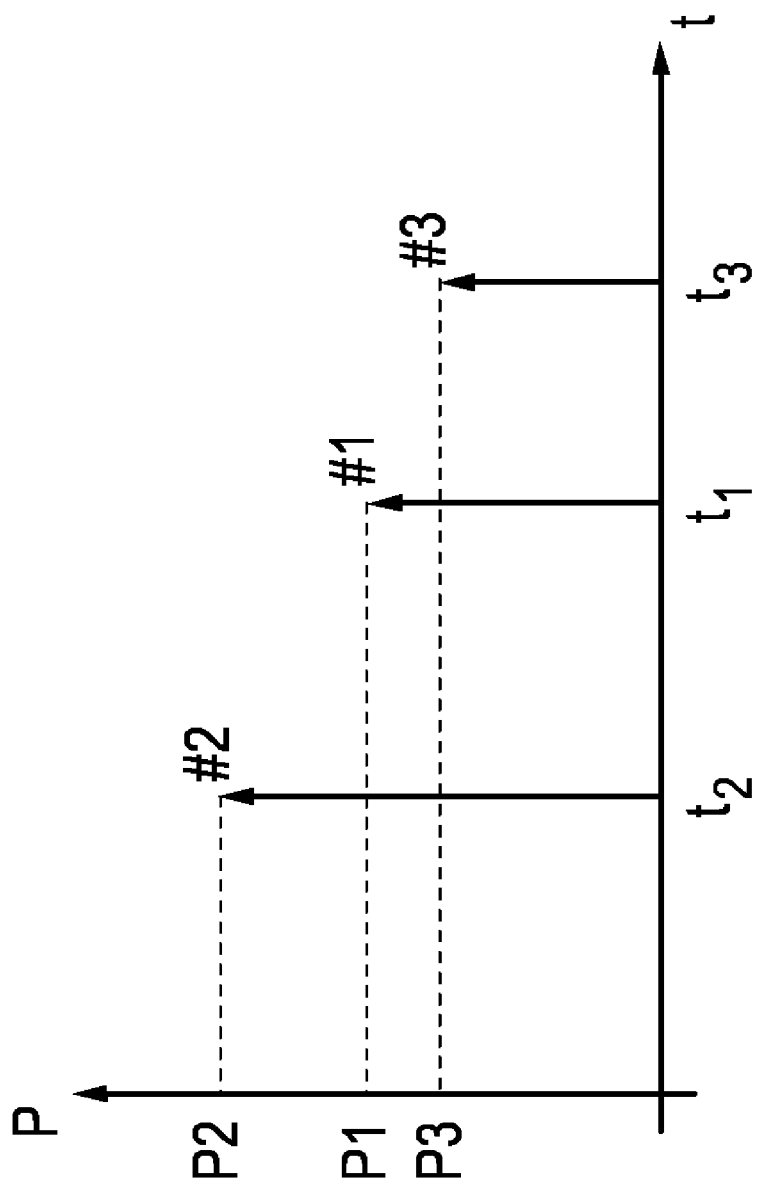
FIG. 3 is a diagram illustrating a relative timing and power differences of different signal components received by the RF receiver device of FIG. 2.

FIG. 2 shows a schematic diagram illustrating an embodiment of a RF receiver device with a demodulator unit of the rake-receiver type in a downlink communication with a base station. FIG. 3 is a diagram illustrating a relative timing and power differences of different signal components received by the RF receiver device of FIG. 2.

As mentioned before, the UMTS standard considers that the used demodulator is of a Rake-receiver type. The present embodiment thus forms an application case of high economic relevance. However, before going into detail with this embodiment, it is to be noted that the invention is applicable outside the UMTS standard as well and does not necessarily require the use of a demodulator of the Rake receiver type.

It is useful to first consider some background and general aspects of this embodiment. After that, the structure and functionality of the demodulation and AFC units 308 and 310 will be explained.

Referring to FIGS. 2 and 3 in parallel, a RF signal transmitted by the base station 100 into a certain range of directions undergoes reflections in some of the different parallel path ways, which are labeled #1 to #3 in FIGS. 2 and 3, before reaching an antenna 302 of a communication device 300. Considering a single burst of transmitted RF signal energy for illustrative purposes, the RF signal received by antenna 302 is thus, apart from the attenuation experienced with increasing propagation distance, split into different received signal bursts #1 to #3 having different signal delays corresponding to their respective propagation paths #1 to #3. The signal burst #2, which is traveling the direct path between the transmitter 100 and the antenna 302 of the communication device 300 and which is not scattered or reflected by any objects on its propagation path #2, obviously has the shortest propagation path and is thus received first, while the components #1 and #3 travel a longer time due to their indirect propagation paths, which are governed by scattering/reflection at obstacles O1 and O3, respectively. The received signal powers P1 to P3 of received signal bursts #1 to #3, plotted on the abscissa of FIG. 3, depend on the respective distance traveled and on the scattering properties of the obstacles hit. The ordinate of FIG. 3 shows the relative timing t1 to t3 of the received signal bursts in terms of a time reference t of the communication device 300.

For simplification of the graphical representation, FIG. 2 only shows the demodulation unit 308, which is sometimes also referred to as a demodulator herein, and the AFC unit 310. Further functional units to be used in communication device 300 in the present context generally correspond to those described in the context of FIG. 1. The demodulator 308 comprises a number of signal processors, which are referred to as the Rake fingers. In the present embodiment, which is of purely illustrative nature, three Rake fingers 308.1 to 308.3 are provided in the demodulator unit 308. Note, however, that the number of Rake fingers can be different from 3. The reason for choosing this number in the present example is that three different signal propagation path #1 to #3 are shown by way of example in FIG. 3. As is typical for a Rake receiver, each Rake finger is assigned to a single propagation path and configured to provide a respective output signal, which represents the symbol as derived from the external RF signals received via the respective propagation path. In the ideal case, each Rake finger processes signals coming over a single resolvable propagation path. The outputs of the Rake fingers 308.1 to 308.3 are recombined to have one single symbol for one base station. The demodulator of the Rake receiver type allows an optimal combining of the energy received via the different propagation paths.

Note that in the present embodiment, the demodulator unit is also configured to provide a respective received-signal power value indicative of a signal power of the demodulated output signals of the receiver unit processed in each respective Rake finger.

Accordingly, the AFC unit 310 uses combined frequency and power estimation. Frequency estimation is done in the frequency-offset estimators 312.1 to 312.3, while power estimation is done for each respective Rake finger in the power estimation sub-units 316.1 to 316.3. The different signals provided by the frequency-offset estimator sub-units 312.1 to 312.3 and the power estimator sub-units 316.1 to 316.3 are provided to the frequency-control unit 314 for use in deriving the frequency-control signal. Details will be described below with reference to FIGS. 4 to 9.

Figure 4:
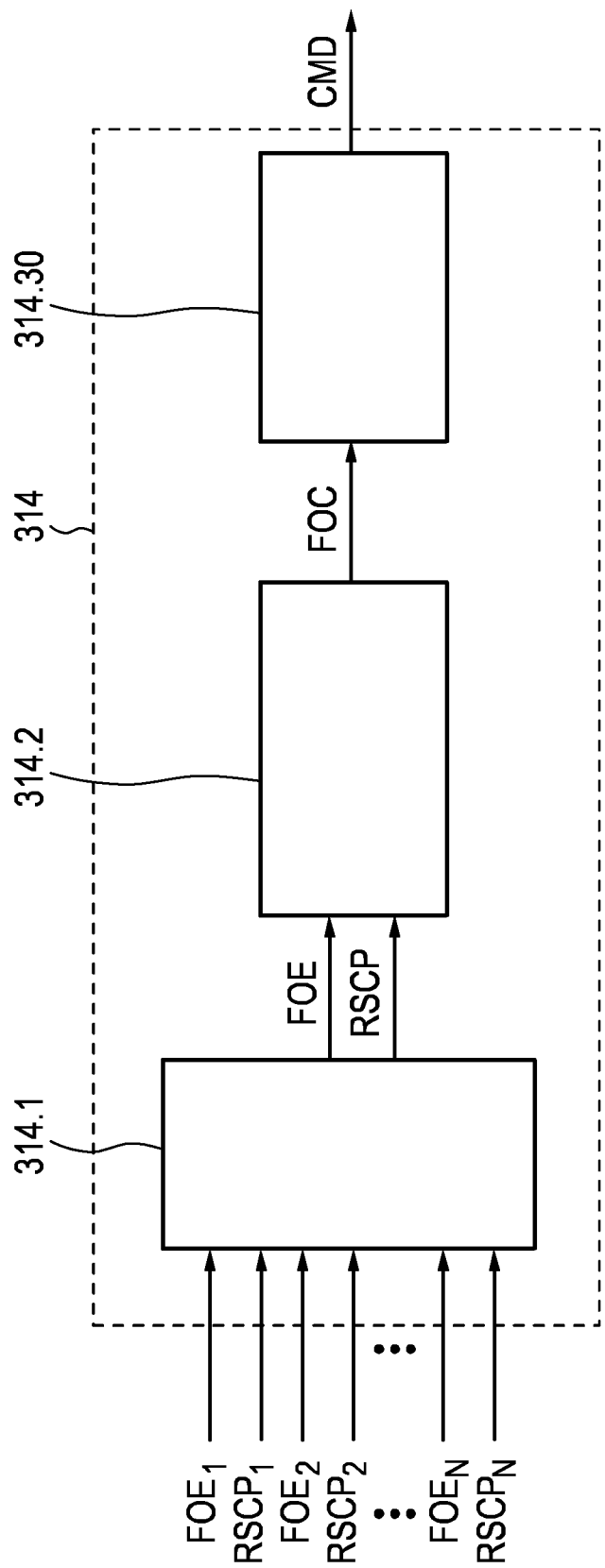
FIG. 4 is a simplified block diagram illustrating a frequency-control unit according to an embodiment of the invention.

FIG. 4 is a simplified block diagram illustrating a frequency-control unit according to an embodiment of the invention. The frequency-control unit of FIG. 4 can for instance be used in the communication device 300 of the embodiment of FIG. 3. Therefore, reference label 314 is used in the following for the frequency-control unit of FIG. 4 as well.

The frequency-control unit 314 has input ports, for instance in the form of incoming wire line connections or in the form of pins, via which it receives output signals of the frequency-offset estimator 312 and the power estimator 316. The output signals of the frequency-offset estimator are marked $FOE_1, FOE_2, \ldots FOE_N$, and the output signals of the power estimator are labeled $RSCP_1, RSCP_2, \ldots, RSCP_N$. Note that while the abbreviation RSCP for received signal code power is used here, this does not imply that the use of other signal power indicators is excluded in other embodiments. The number of inputs depends on the particular demodulator unit of the Rake-receiver type. As can be seen, the inputs to the frequency-control unit are assigned to different Rake fingers of the demodulator unit 308. The frequency-control unit 314 has a first filter stage 314.1, which is configured to derive a combined frequency-error signal FOE from a combination of the respective frequency-error signals $FOE_1, FOE_2, \ldots FOE_N$ associated with different Rake fingers. The first filter stage 314.1 is additionally configured in the present embodiment to derive a combined received-signal-power value from a combination of the different input signals $RSCP_1, RSCP_2, \ldots, RSCP_N$ received from the power estimator 316.

There are different possibilities of combining the respective input signals in the first filter stage 314.1. In one embodiment, the first filter stage 314.1 is configured to select valid measurements before combining those measurements, which have been classified as valid. As a possible implementation, valid frequency-offset estimates are selected on the basis of a threshold applied to the RSCP value associated with a respective FOE value. For instance, only the FOE values related to RSCP, which are bigger than a threshold are used to form the combined frequency-offset estimate FOE, which is provided at the output of the first filter stage.

The combination of frequency-offset estimate values received from the different Rake fingers is suitably a linear combination. In another embodiment the FOE values are averaged in the first filter stage 314.1, according to the following formula:

$$FOE = \frac{\sum_{i=1}^{N} FOE_i \cdot RSCP_i}{N} \qquad \text{(eq. 15)}$$

Another option of combining the FOE values received is using Maximum Ratio Combining (MRC). This way can by expressed with the following formula:

$$FOE = \frac{\sum_{i=1}^{N} FOE_i \cdot RSCP_i}{\sum_{i=1}^{N} RSCP_i} \qquad \text{(eq. 16)}$$

Another possible way to derive the frequency-offset estimate at the output of the first filter stage 314.1 is to select only the FOE value coming form the Rake finger that has the highest associated RSCP value. Another solution is to provide no output RSCP value, if non of the received input FOE values from the Rake fingers reaches a certain threshold value, or, as an alternative, if the mean value of the RSCP values is below a predetermined threshold.

As can be seen in FIG. 4, the first filter stage also provides a combined RSCP value at its output. The output RSCP value is for instance a summation of the RSCP values of received from those Rake fingers, which are considered in deriving the output FOE value. That means, if certain input FOE values do not enter the calculation of the output FOE value, the corresponding RSCP value is omitted from the calculation of the output RSCP value as well. Typically, the remaining FOE values are weighted with the associated RSCP value computed in the power estimator. A threshold on RSCP is in one embodiment applied in two steps and is computed as follows:
a) first, a mean value E(RSCP) of all RSCP values received at the input of the first filter stage 314.1 and allocated to all the different propagation paths is computed. b) Those measurements, which are received from fingers, which have a RSCP value that satisfies the relationship of eq. 13 introduced earlier, namely $$RSCP_i < RSCP_{th} \cdot E(RSCP), \qquad \text{(eq. 13)}$$

wherein RSCP is a threshold RSCP value and E(RSCP) denotes the mean value computed in step a), are discharged from the computation of the output FOE value. In case of E(RSCP)<$RSCP_{th}$ (i.e., eq. 14), the combined FOE related to an associated frame is not considered, and the combined FOE value is not provided at the output, or, in an alternative implementation, is output but neglected by the subsequent second filter stage 314.2. The latter form requires the comparison of eq. 14 to be performed in the second filter stage 314.2.

The second filter stage provides an optimized filtering performance of the AFC unit by adapting the characteristics of the filter to different signal propagation conditions, and a frequency-control signal FOC at its output. The frequency-control signal FOC is provided to a command unit 314.30, which derives a suitable command CMD for controlling the reference frequency of the reference-frequency source of the RF communication device 300.

In an alternative embodiment, the second filter stage 314.2 directly provides the frequency-control signal FOC to the reference-frequency source, which is then interpreted by the reference-frequency source for adapting the reference frequency. This alternative embodiment does not have a command unit.

Figure 5:
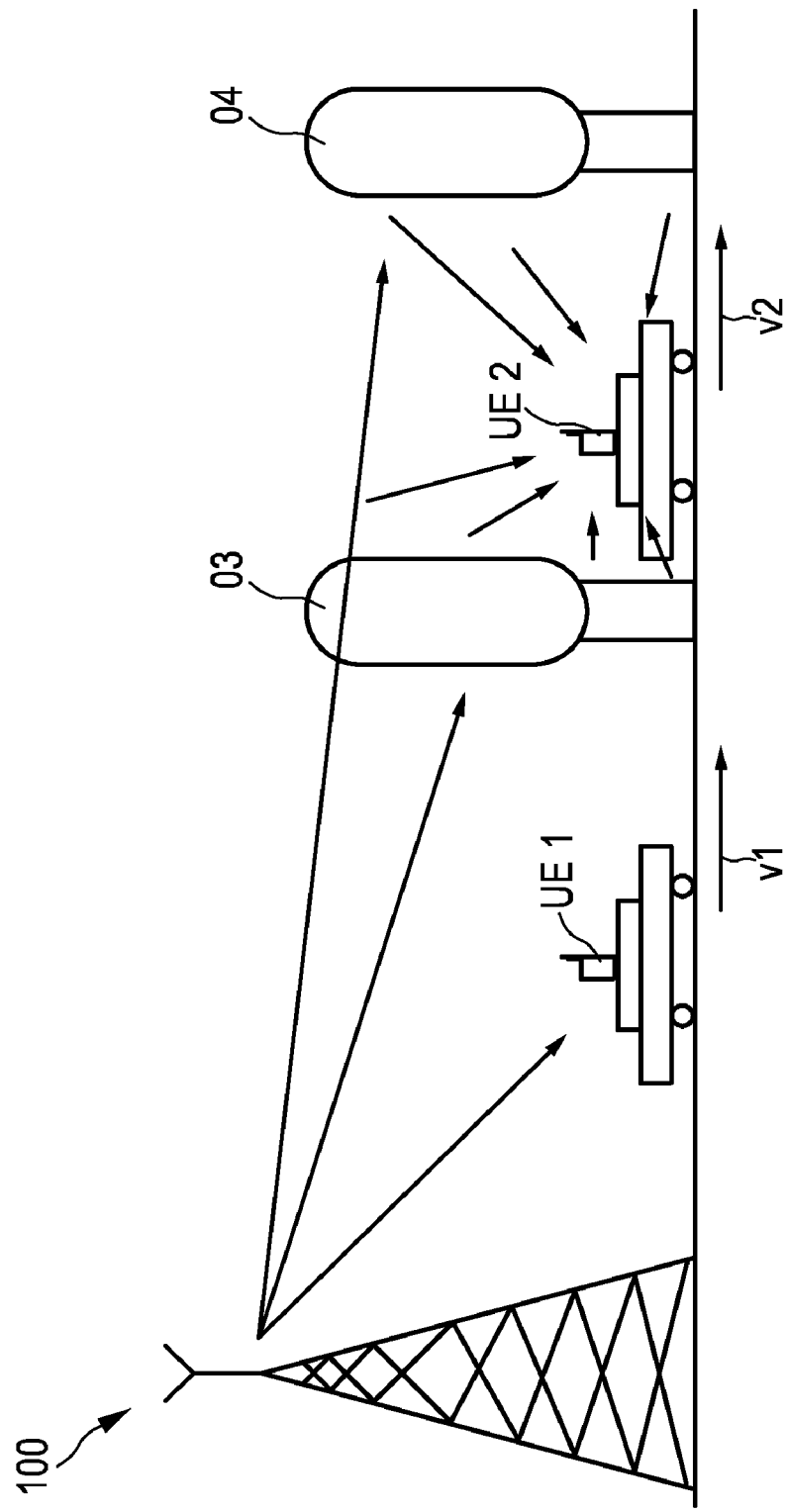
FIG. 5 is an illustration of line-of-sight and non-line-of-sight communication situations between a base station and a communication device.
Figure 7:
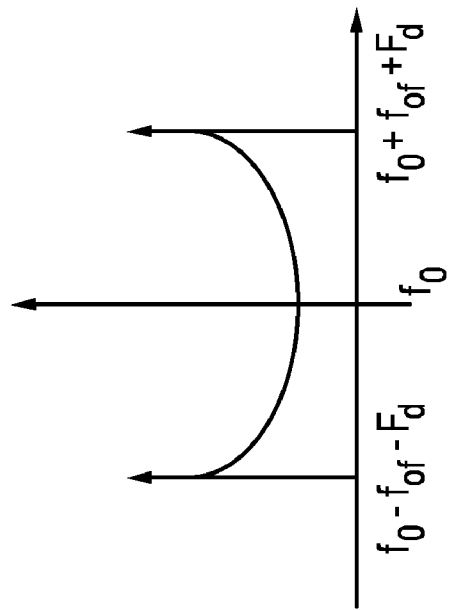
FIGS. 6 and 7 are diagrams schematically illustrating the power spectral density distribution of the received signal in a line-of-sight and a non-line-of-sight communication situation, respectively.
Figure 6:
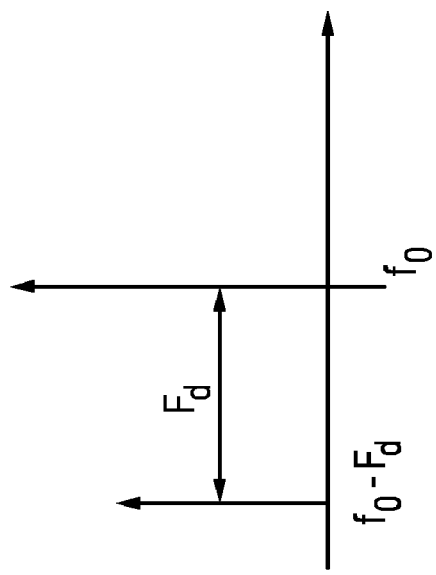

The functionality of the second filter stage 314.2 of the frequency-control unit 314 will be explained further below. However, before going into structural and functional details of the second filter stage 314.2, a general explanation will be given on the background of the correlation-driven approach for the adaptation of the frequency control performed in the second filter stage 314.2 with reference to FIGS. 5 to 7. FIG. 5 is an illustration of line-of-sight and non-line-of-sight communication situations between a base station 100 and a communication device UE 1 and UE 2, respectively. FIGS. 6 and 7 are diagrams schematically illustrating a frequency power distribution in a line-of-sight and a non-line-of-sight communication situation, respectively. The received signal power spectral density in the frequency domain as shown in FIGS. 6 and 7 is equivalent to the statistics of the measured frequency offset in LOS and NLOS cases.

In the previous description, TS 25.101 was cited, stating that received signals will have an apparent error due to Node B frequency error and Doppler shift. However, it is useful to add a further distinction, namely between Doppler shift and Doppler spread. Their causes are almost the same, namely, the movement of the RF communication device 300. But their effects on the statistics of the frequency error are different:

In pure LOS conditions, which are shown in FIG. 5 for a RF communication device UE1 traveling at a velocity v1 in a direction indicated by the arrow v1, the frequency error at a given moment in time is given by the Node B frequency error $f_{of}$ and the Doppler shift $F_d$. This means the variance of the frequency-offset estimation and the power measurement is low. The mean of the observed frequency error is $F_D$. The spectral power distribution due to the Doppler shift exhibits a sharp peak located at $F_d$, and vanishes otherwise. The correlation of the frequency error at lag 1 is high.

Figure 8:
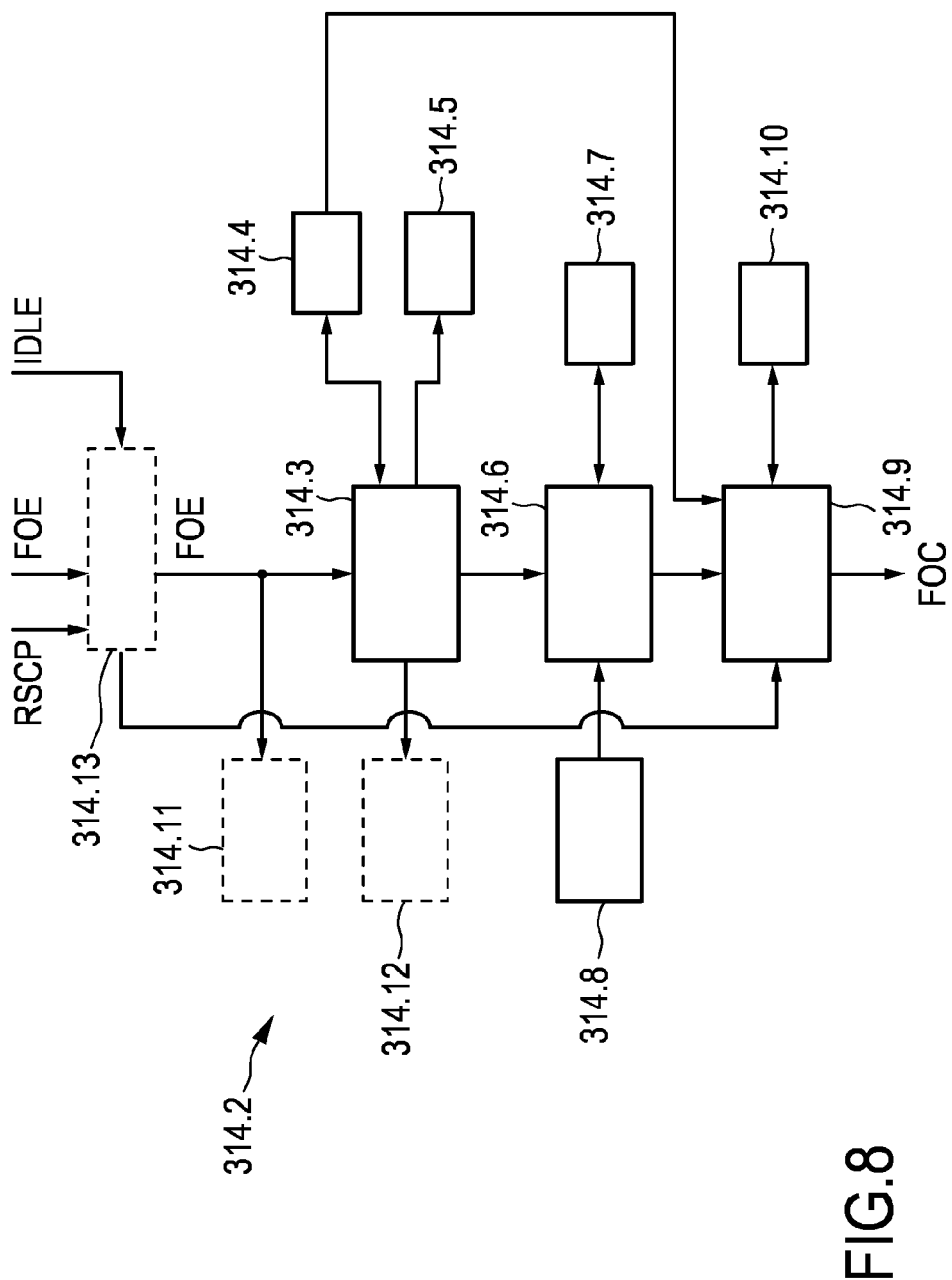
FIG. 8 shows a simplified block diagram of the second filter stage 314.2 according to an embodiment of the invention.

In pure NLOS conditions, which can for instance be modeled by Rayleigh fading, the signal propagation has a behavior that gives rise to a Doppler spread, not a Doppler shift, and a short-term average of the frequency-error estimation vanishes. A NLOS propagation environment is schematically illustrated on the right side of FIG. 5 for RF communication device UE 2 assumed to be traveling at a velocity v2 in the direction indicated by the arrow v2. Here, signals transmitted by the base station 100 are scattered/reflected by many objects in the propagation path, exemplified in FIG. 5 by trees O3 and O4. A typical NLOS propagation environment is an urban environment. Given a motion of the RF communication device UE2 at a velocity v2 in the direction indicated by the arrow labeled v2, the frequency error detected at the RF communication device UE2 will be distributed around the nominal carrier frequency f0 of the base station 100, as indicated by the diagram of FIG. 7. In FIG. 7, f0 again denotes the carrier frequency used at the base station 100. The detected frequency varies between the limits f0-$f_{of}$-$F_d$ and f0+$f_{of}$+$F_d$, wherein $f_{of}$ again denotes the Node B frequency error and $F_d$ denotes the maximum Doppler shift at line-of-sight (LOS) conditions for a given velocity v2. A variance of the frequency-offset estimation and power measurement is dependent on $F_d$, and thus on the velocity v2 of the RF communication device UE 2. The correlation of the frequency error at lag 1 is low. FIG. 8 shows a simplified block diagram of the second filter stage 314.2 according to an embodiment of the invention. The second filter stage 314.2 has a correlation unit 314.3, which receives the FOE value provided by the first filter stage 314.1. The correlation unit is configured to calculate a correlation measure according to eq. 3, i.e.

$$f_{n+1}(FOE) = \frac{E(FOE[n] \cdot FOE[n+1])}{E(FOE^2[n])} \quad \text{(eq. 3)}$$

The correlation unit 314.3 has access to a first buffer 314.4, which stores FOE values of previous cycles as required for the determination of the correlation measure in the present cycle. The number of FOE values to be stored by the correlation unit 314.3 in the first buffer 314.4 also depends on the predetermined size of the moving time window used for forming the mean value in eq. 3. The determined correlation measure is in one embodiment stored in a second buffer 314.5. However, the second buffer 314.5 is optional. The buffers 314.4 and 314.5 can be realized by any form of memory providing short access time.

The correlation measure determined by correlation unit 314.3 is provided to a filter coefficient unit 314.6, which is configured to determine a filter coefficient k according to eq. 2, i.e.

$$k[n]=k[n-1]+\delta \cdot f_{n-1}(FOE) \quad \text{(eq. 2)}$$

In an application example specifically tailored for UMTS, an integration length of 1 frame for the correlation determination is suitable as a reference, but the shorter the integration length the better, in consistency with the precision used for δ. To this end, the filter coefficient unit 314.6 accesses a filter-coefficient buffer 314.7, which stores the filter coefficient(s) determined in the previous cycle(s), and a step-size memory 314.8 that stores a predetermined value of the step size δ. As a specific example, a value of δ corresponding to a integration length of one frame in the correlation determination can suitably be chosen between 0.01 and 0.1. An output of the filter coefficient unit 314.6 is connected with a frequency-offset correction unit 314.9 for providing the determined filter coefficient. The frequency-offset-correction unit calculates a frequency-control signal FOC according to eq. 1, i.e.

$$FOC[n]=FOC[n-1]+k[n]\cdot FOE[n-1] \quad \text{(eq. 1)}$$

The frequency-offset correction unit 314.9 has access to the first buffer 314.4 and to a frequency-control-signal buffer 314.10, which stores the frequency-control signal FOC determined in the next previous cycle.

The second filter stage determines the frequency control signal FOC from incoming FOE values in an iterative manner. The operation is performed so as to minimize a mean square error of the frequency error FOE.

One variant of the second filter stage 314.2 additionally comprises an statistics unit 314.11 at the input side of the second filter stage 314.2 so as to determine the mean square error of the frequency error. Since the statistics unit 314.11 is optional, it is shown with dashed lines in FIG. 8.

In another variant, the determined correlation is additionally used to set the step size δ. To this end, a step-size control unit 314.12 is provided in that embodiment and also printed with dashed lines in FIG. 8 to indicated that it is an option. The use of a variable step size in the adaptation of the filter coefficient k allows to additionally influence the rate of change of k. However, this introduces additional complexity.

In an alternative variant that has a reduced complexity, δ is fixed and the adaptation of k is dependent only on the sign of the determined correlation measure only. That is, k is determined according to eq. 4, $$k_n=k_{n-1}+\delta \cdot \text{sign}(f_n(FOE)) \quad \text{(eq. 4)}$$

Another variant has an Idle-mode controller 314.13 at the input side of the second filter stage 314.2. The Idle-mode controller serves to let the second filter stage 314.2 operate in an Idle mode. The Idle mode is useful in phases of operation, during which the time spans, in which a common pilot signal is not received by the communication device 300, forms a relevant percentage of the reception time.

The Idle-mode controller has a control input for receiving an Idle-mode control bit indicative of whether the second filter stage 314.2 is to operate in an Idle mode or not. In the Idle mode, the Idle-mode control unit 314.13 is configured to directly provide an applicable predetermined k value to the frequency-offset correction unit 314.9 on the basis of a received signal-power measurement (e.g., RSCP value). In the Idle mode, the correlation unit 314.3 need not operate and the Idle-mode controller can for instance block the forwarding of a received FOE value to the correlation control unit 314.3.

In Idle mode conditions, especially in presence of a LOS reception, the frequency offset to be corrected in each measurement occasion can be relevant. The operation of the Idle-mode controller for this situation comprises selecting between strong and weak signals, as indicated by the determined signal-power measurements (RSCP), to apply strong or weak corrections to the filter coefficient, respectively. For instance, a threshold $RSCP_{up}$ can be provided. When the RSCP value for a single measurement is above this threshold, the value of the filter coefficient k is automatically set to a high value, for instance 0.95. A lower value of k, for instance 0.25, can be used in the case of a weak signal. Note that in the Idle mode these are the only criteria used for adjusting k, and the previously described iteration is not used.

Figure 9:
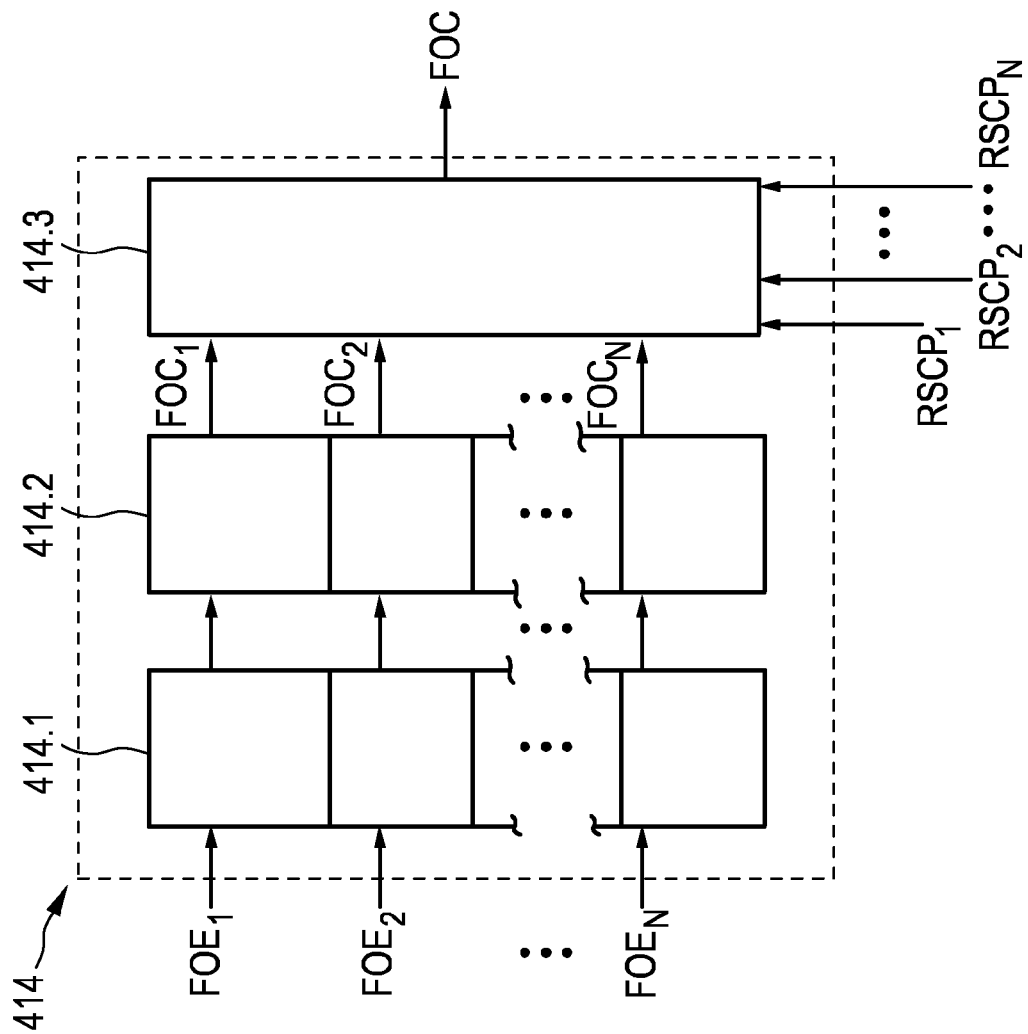
FIG. 9 shows a simplified block diagram illustrating a frequency-control unit according to another embodiment of the invention.

FIG. 9 shows a simplified block diagram illustrating a frequency-control unit 414 according to another embodiment of the invention. The frequency-control unit 414 is configured for operation in a Rake-receiver type of embodiment. It forms an alternative implementation to the frequency-control unit 314 of FIG. 4. The present implementation of the frequency-control unit is configured to process the individual FOE values of the Rake fingers received at its input side individually to derive filter-coefficient components $k_j[n]$, which are subsequently combined to determine the filter coefficient and, thus, the frequency-control signal. More specifically, a correlator unit 414.1 comprises a plurality of N correlator stages, each configured to determine the correlation measure for the individual $FOE_j$ according to eq. 3. The principles of the correlation determination have been described elsewhere. The N correlation measures are output from the correlation unit 414.1 to a filter-coefficient unit 414.2, which again has N filter-coefficient stages for processing the received FOE values according to eq. 5. The graphical representation of the individual units of the frequency-control unit 414 is somewhat simplified in comparison with that of FIG. 8. However, the description of the embodiment of FIG. 8 may serve as a reference for implementing the functionalities of the individual stages for each FOE value.

From the individual filter coefficients $k_j[n]$ determined in the filter-coefficient unit 414.2, individual frequency-control-signal components $FOC_j[n]$ are determined and than forwarded to a combining unit 414.3. The frequency-control-signal components $FOC_j[n]$ are determined in correspondence to eq. 1 for each component. The combining unit 414.3 is configured to perform a maximum ratio combining of the $FOC_j$ according to eq. 7, i.e.

$$FOC = \sum_j a_j FOC_j \qquad \text{(eq. 7)}$$

The weight factors $a_j$ are in the present embodiment determined according to eq. 12, i.e.

$$a_j(n) = a_j(RSCP_{j,n}) \qquad \text{(eq. 12)}$$

The frequency-control unit 414 of FIG. 9 is more complex than the frequency-control unit 314 of FIG. 4 because the individual signal components of the Rake fingers are processed individually through several stages before forming a combined frequency-control signal FOC. To reduce the complexity, a variant can make use of eq. 8 to determine a single correlation measure and a single filter coefficient k[n] according to eq. 9.

The principle exploited by the embodiment of FIG. 9 and its variants is that for weak Rake fingers, k will be low. A weak finger will therefore have less weight in the frequency correction. In contrast, strong fingers will be the main drivers for the frequency correction.

According to the foregoing description, one aspect of the present invention relates to a frequency-control unit for use in controlling a reference frequency of an external controllable reference-frequency source. The frequency-control unit comprises a filter unit with a controllable filter parameter (k), which is configured to derive, using the filter parameter, from a frequency-error signal (FOE) a frequency-control signal (FOC) for minimizing the frequency error of the reference frequency; and a correlation unit, which is configured to determine from frequency errors (FOE) of the reference frequency at different points in time a correlation measure indicative of a correlation between the frequency errors (FOE) at the different points in time. The frequency-control unit is configured to adapt the controllable filter parameter (k) of the filter unit in dependence on the determined correlation measure.

In particular embodiments presented, the value of the filter parameter (k) depends not only on the correlation in the frequency error but also on a receiver path strength, as specified for instance by a RSCP value. These embodiments therefore merge aspects of linear and non-linear filtering on a single branch. The dependence of the filter parameter (k) not only on a lag-1 correlation computed on frequency errors (FOE) but also on the received power per paths (RSCP) can be considered as a correlation at lag-0 on channel estimates. While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A frequency-control unit for use in controlling a reference frequency of an external controllable reference-frequency source, the frequency-control unit comprising:
a filter unit with a controllable filter parameter, which filter unit is configured to derive, using the controllable filter parameter, from a frequency-error signal, which is receivable via an input terminal of the frequency-control unit and indicative of a frequency error of the reference frequency with respect to a signal frequency of an external radio-frequency signal, a frequency-control signal for minimizing the frequency error of the reference frequency, and to provide the frequency-control signal at its output for use in controlling the reference frequency of the external controllable reference-frequency source; and
a correlation unit, which is configured to determine from frequency errors of the reference frequency at different points in time a correlation measure indicative of a correlation between the frequency errors at the different points in time,
wherein the frequency-control unit is configured to adapt the controllable filter parameter of the filter unit in dependence on the determined correlation measure.

2. The frequency-control unit of claim 1, which is configured to adapt, as a filter parameter, a frequency bandwidth of the filter unit in dependence on the determined correlation measure.

3. The frequency-control unit of claim 1, which has an additional input terminal for a received-signal-power value and which is configured to adapt the controllable filter parameter of the filter unit in additional dependence on a received signal power.

4. The frequency-control unit of claim 1, which comprises a statistics unit coupled with the filter unit and configured to determine at least one statistical parameter of the frequency error over a predetermined number of points in time, the at least one statistical parameter being different from said correlation measure, wherein the frequency-control unit is configured to derive the frequency-control signal in additional dependence on the at least one statistical parameter of the frequency error.

5. The frequency-control unit of claim 1, which is configured to derive the frequency-control signal in a situation of continuous reception of RF signals such that at a point in time n the frequency-control signal is derived in dependence on the frequency-control signal at a foregoing point in time in correspondence to the formula $$FOC[n] = FOC[n-1] + k[n] \cdot FOE[n],$$

wherein FOC[n] denotes a frequency-control-signal value at the point in time n, FOC[n−1] denotes a frequency-control-signal value at the point in time n−1, FOE[n] denotes the frequency error at the point in time n, and k[n] denotes, as one of the filter parameters of the filter unit, a filter coefficient at the point in time n.

6. The frequency-control unit of claim 5, which is configured to determine the filter coefficient k[n] according to the formula $$k[n] = k[n-1] + \delta \cdot f(FOE)$$

wherein k[n−1] denotes a filter coefficient at the point in time n−1, δ denotes a step size for the adaptation of k and thus corresponds to a rate of change of k, and f(FOE) is the correlation measure of frequency-errors related to RF signals received at different points in time.

7. The frequency control unit of claim 1, which is configured to determine the correlation measure according to the formula $$f_{n+1}(FOE)=E(FOE[n]\cdot FOE[n+1])/E(FOE^2[n])$$

wherein E( . . . ) denotes an operation of forming a mean value of the term included in the brackets.

8. The frequency control unit of claim 1, which is configured to set, in a situation of discontinuous reception, the at least one filter coefficient to a predetermined constant value.

9. The frequency control unit of claim 1, which has an input for received-signal-power value indicative of a signal power of demodulated output signals derived from the external RF signal, wherein the frequency-control unit is configured to set the at least one filter coefficient to a predetermined lower first constant value in the presence of a received-signal power value not exceeding a receive-signal-power threshold value, and to a predetermined higher second constant value in the presence of a received-signal power value exceeding the receive-signal-power threshold value.

10. The frequency control unit of claim 1, which has input ports being assigned to different Rake fingers of an external demodulator unit of the Rake receiver type, and which is configured to determine the correlation measure from a combination of the frequency-error signals provided by the Rake fingers, wherein RF signals corresponding to different propagation paths and processed in different Rake fingers are associated with a single point in time for the purpose of determining the correlation measure.

11. The frequency-control unit of claim 10, which is configured to determine the correlation measure as a linear combination of respective correlation measures between frequency errors associated with received respective RF signals at the Rake fingers.

12. The frequency-control unit of claim 10, which is configured to determine Rake-finger coefficients according to the formula $$k_j[n]=k_j[n-1]+\delta\cdot f_n(FOE_j)$$

wherein $k_j[n-1]$ denotes a Rake-finger coefficient at the point in time n−1 for a Rake finger indexed by j, δ denotes a step size for the adaptation of k and thus corresponds to a rate of change of $k_j$, and $f_n$ ($FOE_j$) is the correlation measure of frequency-errors of the rake finger indexed by j related to RF signals received by this Rake finger at different points in time, and to determine the filter coefficient as a linear combination of the Rake-finger coefficients.

13. The frequency-control unit of claim 10, which is configured to determine a mean value of the received-signal-power values of all Rake fingers, and to disregard all Rake fingers with received-signal-power values contributing to the mean value for the purpose of deriving a frequency-control signal, if the mean value does not exceed a predetermined threshold value.

14. The frequency-control unit of claim 10, wherein the filter unit comprises:
a first filter stage configured to derive a combined frequency-error signal from a combination of the respective frequency-error signals associated with different Rake fingers; and
a second filter stage, which is coupled with the first filter stage and which is configured to derive the frequency-control signal.

15. An RF receiver device, which comprises:
a controllable reference-frequency unit, which is configured to provide at its output a reference signal having a reference frequency, the reference frequency depending on a frequency-control signal;
a receiver unit, which is coupled with the controllable reference-frequency unit and coupled with an antenna, and which is configured to down-convert, using the reference signal, RF signals received via the external antenna and to provide the down-converted RF signals as output signals;
a frequency-offset estimator, which is coupled with the receiver unit and configured to provide at its output a frequency-error signal indicative of a frequency error of the reference signal with respect to a frequency of the received RF signals; and
a frequency control unit comprising:
a filter unit with a controllable filter parameter, which filter unit is configured to derive, using the controllable filter parameter, from the frequency-error signal, which is receivable via an input terminal of the frequency-control unit and indicative of a frequency error of the reference frequency with respect to a signal frequency of an external radio-frequency signal, the frequency-control signal for minimizing the frequency error of the reference frequency, and to provide the frequency-control signal at its output for use in controlling the reference frequency of the external controllable reference-frequency source; and
a correlation unit, which is configured to determine from frequency errors of the reference frequency at different points in time a correlation measure indicative of a correlation between the frequency errors at the different points in time,
wherein the frequency-control unit is configured to adapt the controllable filter parameter of the filter unit in dependence on the determined correlation measure.

16. The RF receiver device of claim 15, further comprising a demodulator unit, which is configured to demodulate the output signals of the receiver unit and to determine and provide at its output received-signal-power values indicative of a signal power of the demodulated output signals of the receiver unit.

17. The RF receiver device of claim 15, which further comprises a demodulator unit of the Rake-receiver type, which, in a direction of signal flow, is coupled between the receiver unit and the frequency-offset estimator and which is configured to demodulate the output signals of the receiver unit via plurality of Rake fingers, different Rake fingers being assigned to output signals corresponding to RF signals received by the receiver unit at different points in time due to propagation of the RF signal along different propagation paths, and to provide output signals from each Rake finger representing symbols derived from the external RF signals received via different propagation paths, wherein
the frequency-offset estimator is configured to provide respective frequency-error signals individually for each Rake finger; and
the frequency-control unit is configured to derive the frequency-control signal using the frequency-control signals from the different Rake fingers.

18. The RF receiver device of claim 15, wherein the demodulator unit is further configured to determine and provide at its output respective received-signal-power values indicative of a signal power received via a respective one of the Rake fingers.

19. An RF communication device including an RF receiver, comprising:
   a controllable reference-frequency unit, which is configured to provide at its output a reference signal having a reference frequency, the reference frequency depending on a frequency-control signal;
   a receiver unit, which is coupled with the controllable reference-frequency unit and coupled with an antenna, and which is configured to down-convert, using the reference signal, RF signals received via the external antenna and to provide the down-converted RF signals as output signals;
   a frequency-offset estimator, which is coupled with the receiver unit and configured to provide at its output a frequency-error signal indicative of a frequency error of the reference signal with respect to a frequency of the received RF signals; and
   a frequency control unit comprising:
   a filter unit with a controllable filter parameter, which filter unit is configured to derive, using the controllable filter parameter, from the frequency-error signal, which is receivable via an input terminal of the frequency-control unit and indicative of a frequency error of the reference frequency with respect to a signal frequency of an external radio-frequency signal, the frequency-control signal for minimizing the frequency error of the reference frequency, and to provide the frequency-control signal at its output for use in controlling the reference frequency of the external controllable reference-frequency source; and
   a correlation unit, which is configured to determine from frequency errors of the reference frequency at different points in time a correlation measure indicative of a correlation between the frequency errors at the different points in time,
   wherein the frequency-control unit is configured to adapt the controllable filter parameter of the filter unit in dependence on the determined correlation measure.

20. The RF communication device of claim 19, which is configured to receive and process RF signals according to a UMTS standard.

21. A method for controlling a frequency of a reference signal in a RF receiver device, comprising:
   providing a reference signal having a reference frequency, the reference frequency depending on a frequency-control signal;
   receiving RF signals;
   determining a frequency-error signal indicative of a frequency error of the reference signal with respect to a frequency of the received RF signals; and
   deriving, using predetermined filter parameters, from the frequency-error signal a frequency-control signal for minimizing the frequency error and providing the frequency-control signal to an external controllable reference-frequency source that provides the reference signal,
   wherein deriving the frequency-control signal comprises determining a correlation measure between the frequency errors related to RF signals received at different points in time and setting at least one of the filter parameters in dependence on the determined correlation measure, thus adaptively deriving the frequency-control signal.

22. A computer program including program code for causing a computer to carry out a method for controlling a frequency of a reference signal in a RF receiver device, when the computer program is carried out on a computer, the method comprising:
   providing a reference signal having a reference frequency, the reference frequency depending on a frequency-control signal;
   receiving RF signals;
   determining a frequency-error signal indicative of a frequency error of the reference signal with respect to a frequency of the received RF signals; and
   deriving, using predetermined filter parameters, from the frequency-error signal a frequency-control signal for minimizing the frequency error and providing the frequency-control signal to an external controllable reference-frequency source that provides the reference signal,
   wherein deriving the frequency-control signal comprises determining a correlation measure between the frequency errors related to RF signals received at different points in time and setting at least one of the filter parameters in dependence on the determined correlation measure, thus adaptively deriving the frequency-control signal.

* * * * *